US007182005B1

(12) United States Patent
Hsieh

(10) Patent No.: US 7,182,005 B1
(45) Date of Patent: Feb. 27, 2007

(54) OMNIDIRECTIONAL TWISTING TOOL

(76) Inventor: Chih-Ching Hsieh, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/357,848

(22) Filed: Feb. 21, 2006

Related U.S. Application Data

(62) Division of application No. 11/203,948, filed on Aug. 16, 2005.

(51) Int. Cl.
*B25B 23/142* (2006.01)
*B25B 23/159* (2006.01)
*B25B 23/155* (2006.01)
*B25B 23/157* (2006.01)
*F16D 1/00* (2006.01)

(52) U.S. Cl. ............................ 81/478; 81/475; 81/472; 403/349

(58) Field of Classification Search .................. 81/478, 81/475, 472, 473, 177.1, 177.8, 177.9, 489; 403/349
See application file for complete search history.

(56) References Cited

U.S. PATENT DOCUMENTS 4,467,678 A * 8/1984 Lindholm .................... 81/483
4,586,406 A * 5/1986 Howard ..................... 81/177.2
5,662,012 A * 9/1997 Grabovac .................... 81/483
5,816,809 A * 10/1998 Sapkos ....................... 433/172
5,960,685 A * 10/1999 Shyong-Chuan et al. ..... 81/463
6,053,076 A * 4/2000 Barnes .......................... 81/60
6,216,565 B1 * 4/2001 McCann .................... 81/177.8
6,334,377 B1 * 1/2002 Wu ............................. 81/478
6,968,759 B2 * 11/2005 Becker et al. ................ 81/479
2004/0159164 A1 * 8/2004 Curry ...................... 73/862.21

* cited by examiner

*Primary Examiner*—Lee D. Wilson
*Assistant Examiner*—Alvin J. Grant

(57) ABSTRACT

An omnidirectional twisting tool comprises a handle; the handle being a hollow tube body; one end of the handle being opened; a strain gauge installed at a lower portion of the handle; the strain gauge including an integrating element and a connecting unit for connecting the integrating element and the driving portion; a driving head at a front end of the spanner body; a rotary unit at another end of the driving head; an annular groove being formed at a lateral wall of the rotary unit; the rotary unit being pivotally installed at one end of the handle so that the driving head can rotate through 360 degrees around an axis of the handle; a connecting rod extending from a lower end of the rotary unit; the connecting rod being received within the handle; and the connecting rod being connected to the connecting unit.

3 Claims, 9 Drawing Sheets

OMNIDIRECTIONAL TWISTING TOOL

The present invention is a divisional patent application of the U.S. patent Ser. No. 11,203,948 dated 16 Aug. 2005, assigned and invented by the applicant of the present invention. Thereby the content of the patent, U.S. patent Ser. No. 11,203,948, is incorporated into the present invention as a part of the present invention.

In the present invention, the contents of the FIGS. 15 and 16 in the original U.S. patent Ser. No. 11,203,948 is selected and claimed in this application. No other new matter is added.

FIELD OF THE INVENTION

The present invention relates to twisting tools, and particularly to an omnidirectional twisting tool, wherein the driving head is rotatable through 360 degrees around an axis of the handle and also rotates along an axis parallel to the longitudinal axis of the handle.

BACKGROUND OF THE INVENTION

Currently, many tools are equipped with strain gauges for measuring the twisting forces applied to the tool. Thereby the user can view the value of the strain gauge to decide the force applied to the tool. Thus the screw can be driven properly without breakage.

In the prior art, strain gauge spanner measures twisting forces, however, the driving end of the spanner is fixed. The diving head is not rotatable or the driving head only rotates within a finite range. It is not an omni-directional device. Thus the prior art is not suitable for various operating environments. Thereby the working efficiency is low and thus the users are less willing to buy this kind of spanners.

SUMMARY OF THE INVENTION

Accordingly, the primary object of the present invention is to provide an omnidirectional twisting tool, wherein the driving head is rotatable through 360 degrees around an axis of the handle and also rotates along an axis vertical to the axis of the handle.

To achieve above objects, the present invention provides an omnidirectional twisting tool which comprises a handle; the handle being a hollow tube body; one end of the handle being opened; a strain gauge installed at a lower portion of the handle; the strain gauge including an integrating element and a connecting unit for connecting the integrating element and the driving portion; by the connecting unit, the twisting force value being displayed on a display; a driving head at a front end of the spanner body; a rotary unit at one end of the driving head; an annular groove being formed at a lateral wall of the rotary unit; the rotary unit being pivotally installed at one end of the handle so that the driving head can rotate through 360 degrees around an axis of the handle; a connecting rod extending from a lower end of the rotary unit; the connecting rod being received within the handle; the connecting rod being connected to the connecting unit so as to transfer twisting forces of the spanner to the integrating element of the strain gauge.

The various objects and advantages of the present invention will be more readily understood from the following detailed description when read in conjunction with the appended drawing.

DETAILED DESCRIPTION OF THE INVENTION

Figure 1:
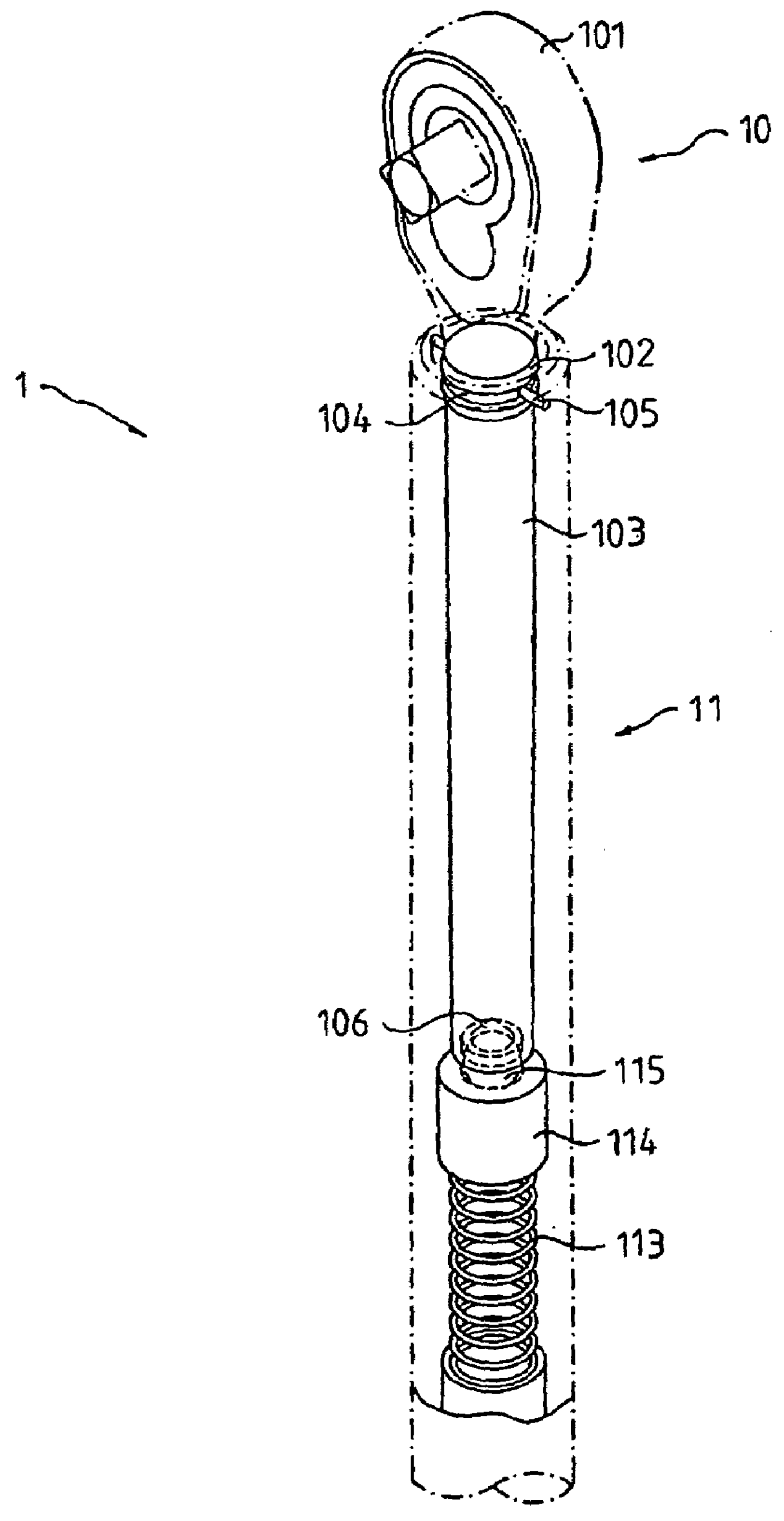
FIG. 1 is a perspective view of the omnidirectional twisting tool of the present invention.
Figure 2:
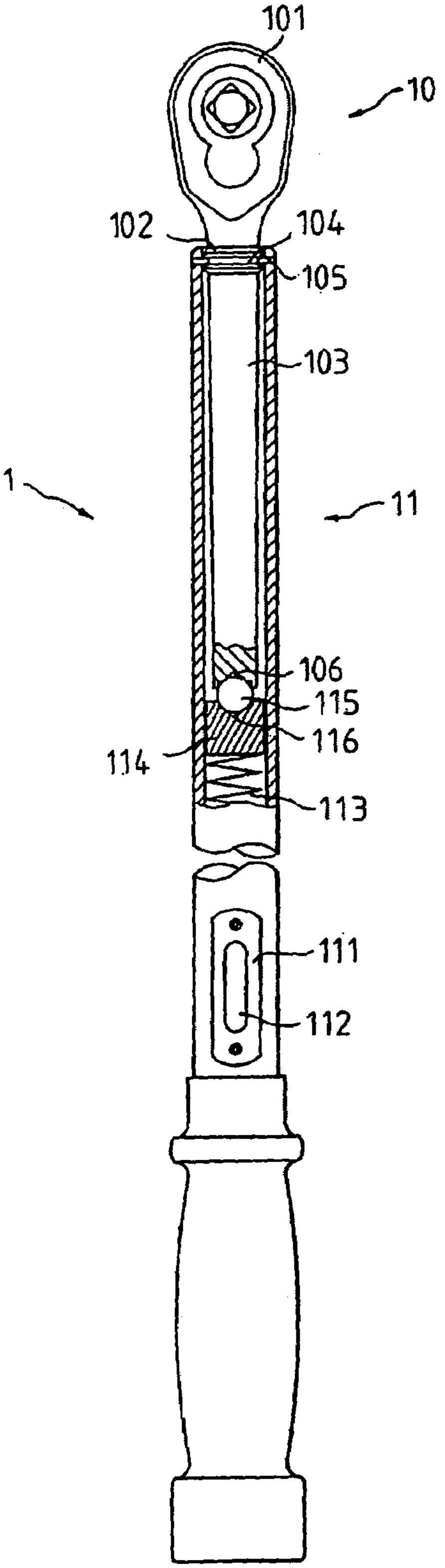
FIG. 2 is a cross sectional view of the omnidirectional twisting tool of the present invention.
Figure 3:
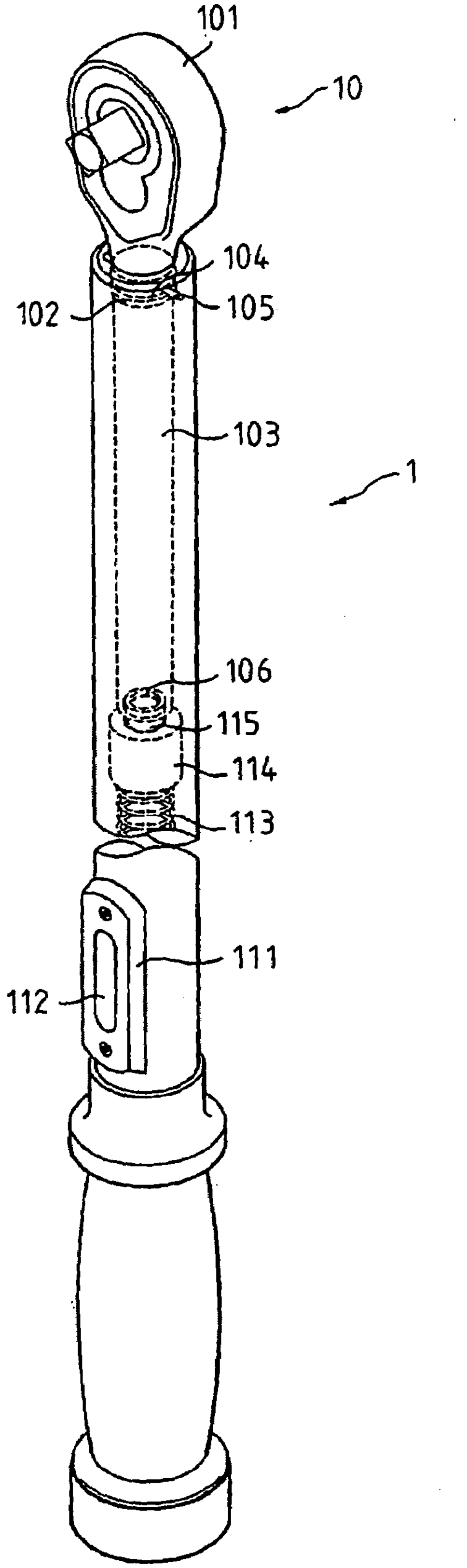
FIG. 3 is a perspective view of the omnidirectional twisting tool of the present invention.
Figure 4:
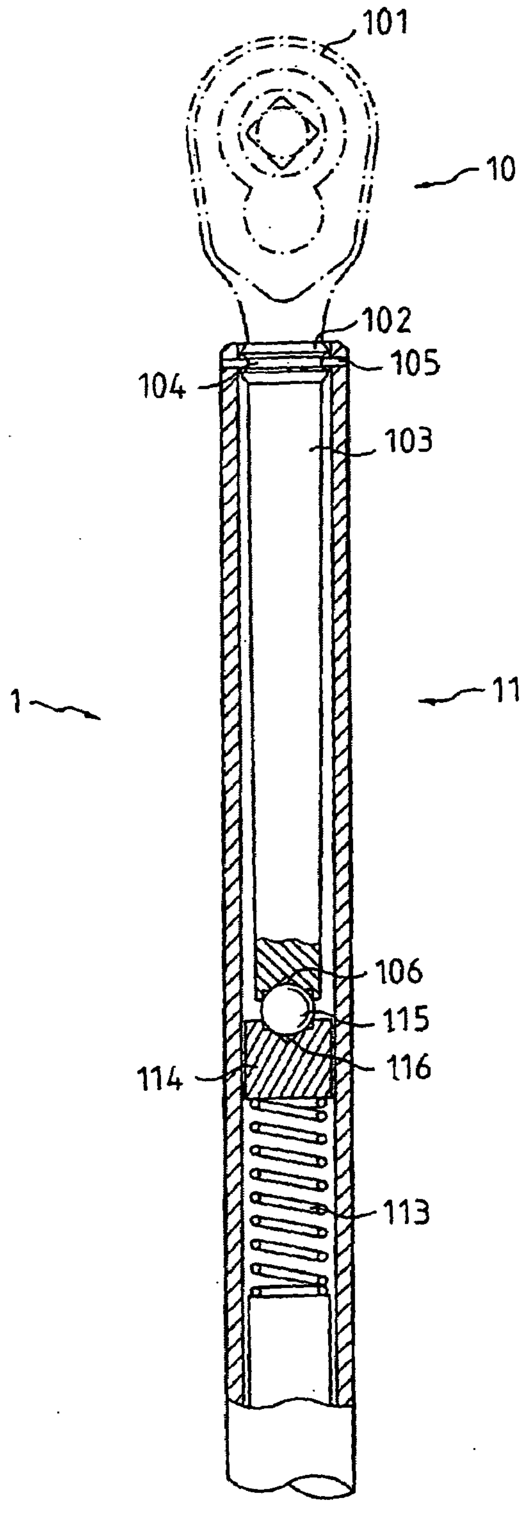
FIG. 4 is a partial cross sectional view of the omnidirectional twisting tool of the present invention.

In order that those skilled in the art can further understand the present invention, a description will be provided below in details. However, these descriptions and the appended drawings are only used to cause those skilled in the art to understand the objects, features, and characteristics of the present invention, are not to be used to confine the scope and spirit of the present invention defined in the appended claims.

Referring to FIGS. 1 to 4, the omnidirectional twisting tool of the present invention is illustrated. In this embodiment, the tool is a spanner body 1. In this embodiment, the spanner body 1 is a twisting tool for driving a screw element and the twisting force in operation can be displayed (the device for measuring the twisting force, a strain gauge, is known in the prior art and thus the details will not be described herein).

The structure of the present invention will be described herein.

The spanner body 1 has a driving portion 10 at one end thereof and a handle 11.

A handle 11 is included. The handle 11 is a hollow tube body. One end of the handle 11 is opened.

A strain gauge is installed at a lower portion of the handle 11. The strain gauge includes an integrating element 111 and a connecting unit for connecting the integrating element 111 and the driving portion 10. Twisting force values are displayed on a display 112. The connecting unit is formed by an elastic element 113, a supporter 114 and a ball 115. One end of the supporter 114 is in contact with the elastic element 113 and another end thereof is formed with a recess 116 for receiving a part of the ball 115.

A driving head 101 is at a front end of the spanner body. The driving head 101 has one of various forms for driving a screw element. In this embodiment, the driving head 101 is a ratchet wheel driving head.

A cambered rotary unit 102 is at another end of the driving head 101. An annular groove 104 is formed at a lateral wall of the rotary unit 102. The rotary unit 102 is pivotally installed at one end of the handle 11 by using pins 105 to pass through the handle 11 and clamp the rotary unit 102 to be retained within the handle 11 so that the driving head 101 can rotate through 360 degrees around an axis of the handle 11.

A lower end of the rotary unit 102 is extended with a connecting rod 103 which is received within the handle 11. A lower end of the connecting rod 103 is formed with a notch 106 for receiving another part of the ball 115 of the connecting unit of the strain gauge. Thereby the ball 115 is confined by the connecting rod 103 and the supporter 114. Thus the driving portion 10 is interacted with the connecting unit so as to transfer the twisting force to the integrating element 111.

In assembly of the present invention, the connecting rod 103 of the driving portion 10 is received into the handle 11. A part of the ball 115 is received in the notch 106 of the connecting rod 103. The pins 105 pass through the handle 11 to be located in the annular groove 104 of the rotary unit 102 so as to retain the rotary unit 102 within the handle 11. Thus the assembly of the present invention is complete.

Figure 5:
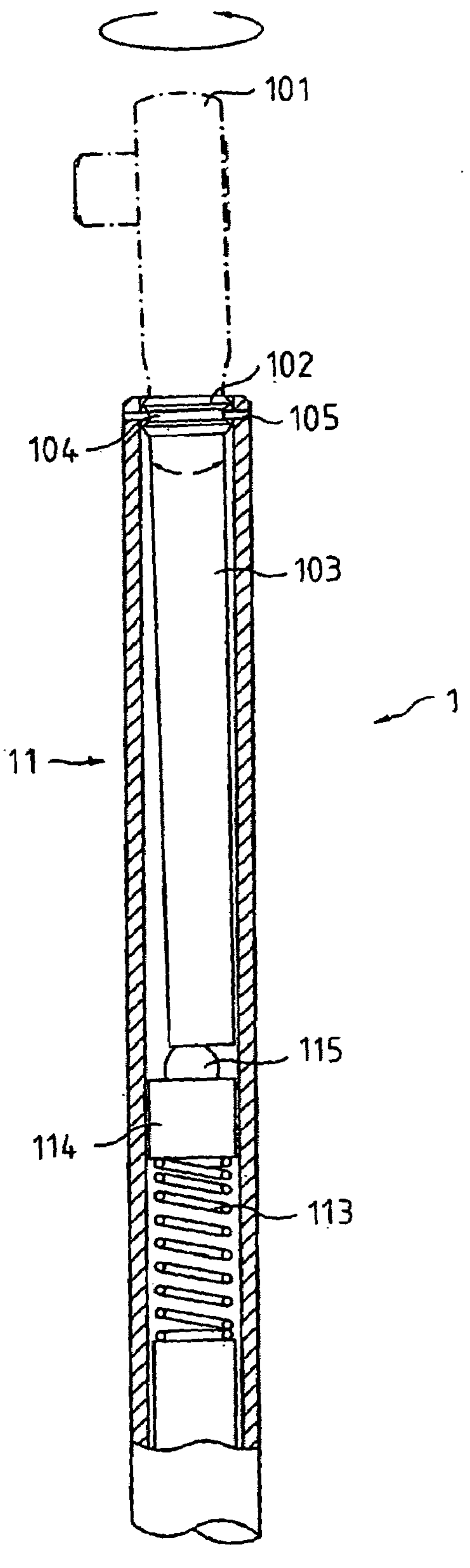
FIG. 5 is a cross sectional view about the omnidirectional twisting tool of the present invention.
Figure 6:
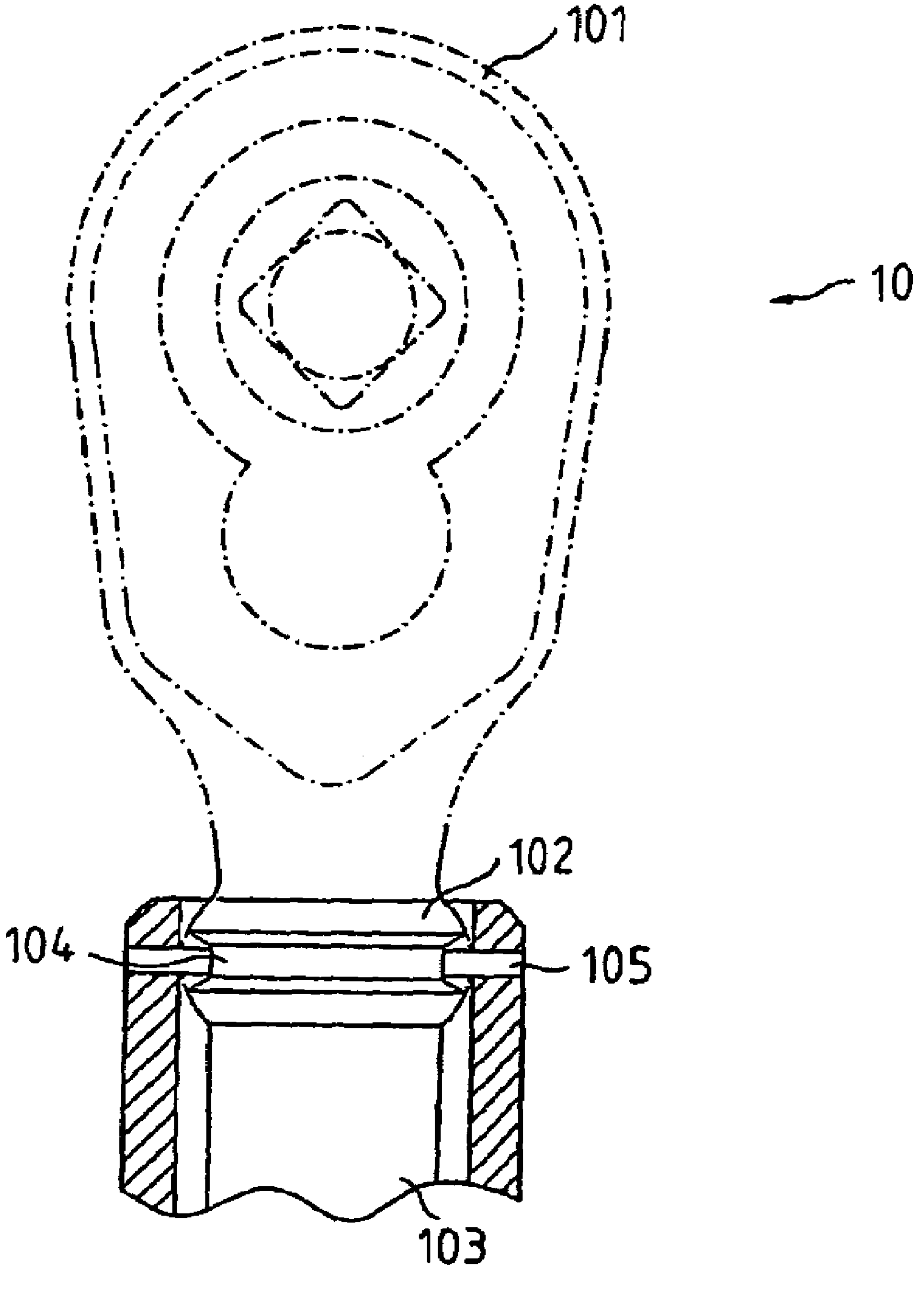
FIGS. 6 and 7 are partial enlarged views of the omnidirectional twisting tool of the present invention.
Figure 7:
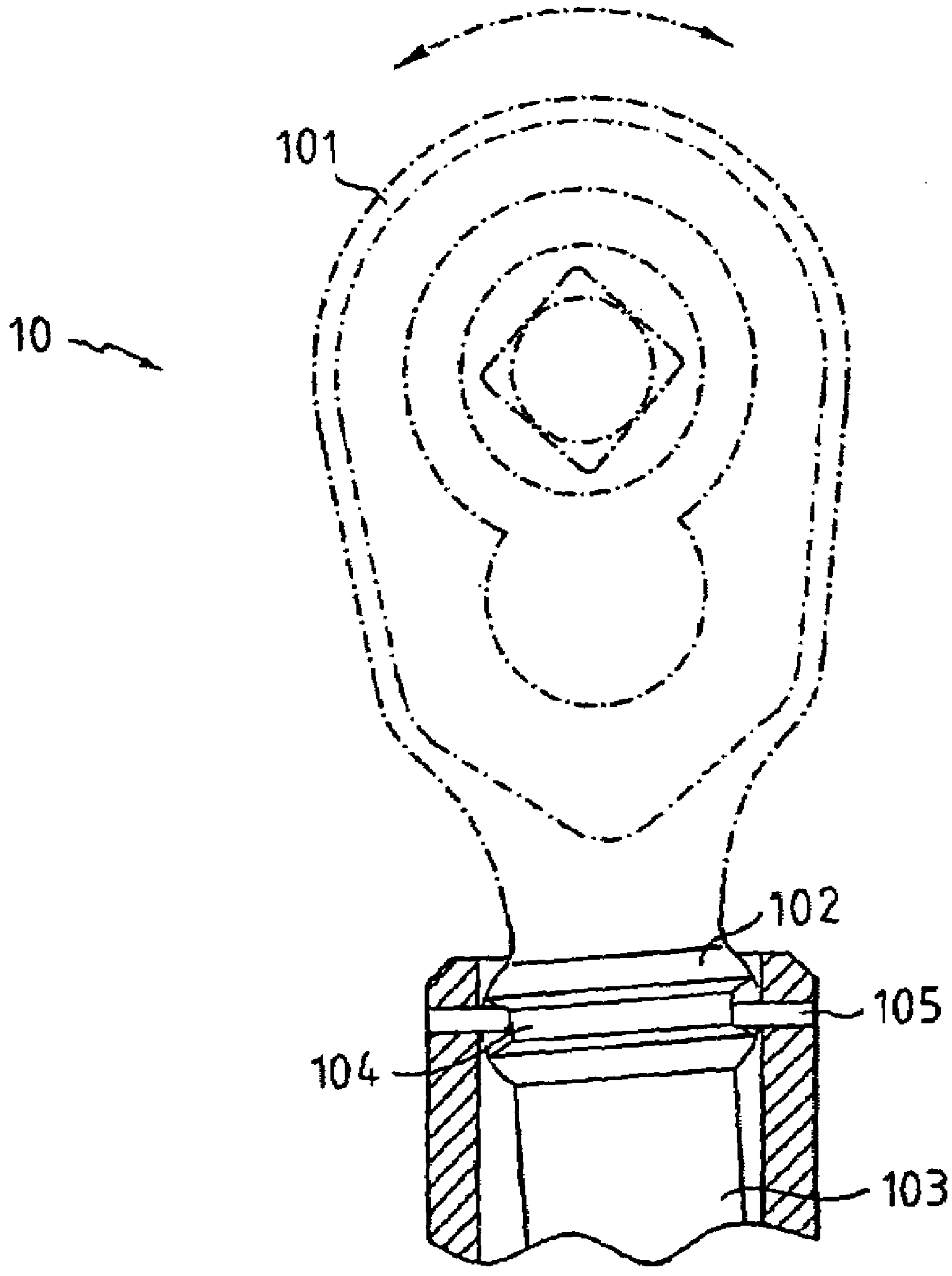

Referring to FIGS. 5 to 7, the use of the present invention is illustrated. The pins 105 confines the rotary unit 102 so that the driving portion 10 is rotatable through 360 degrees. The connecting rod 103 is received in the hollow space of the handle 11. The notch 106 of the connecting rod 103 receives a part of the ball 115. Another part of the ball 115 is received in the supporter 114. The elastic element 113 is connected below the supporter 114. The elastic element 114 is in contact with the integrating element 111. When the driving head 101 serves to drive a screw unit, the integrating element 111 can measure the twisting force through the transfer of the connecting rod 103. The value of the twisting force is displayed on the display 112. Furthermore, the driving portion 10 is pivotally installed above the handle 11. It indirectly contacts the handle 11. Thereby the driving portion 10 is rotatable omni-directional. Two ends of a cross section of the annular groove 104 are formed as tapered shapes. Thereby other then rotating through 360 degrees around the axis of the handle 11, the driving portion 10 can rotate around a center of the annular groove 104 according to the arc of the tapered shape (referring to FIG. 7), for example, rotating through 15 degrees. Thereby the user can adjust the orientation of the driving head 101 according to the operation environment so as to increase the operation efficiency.

Figure 8:
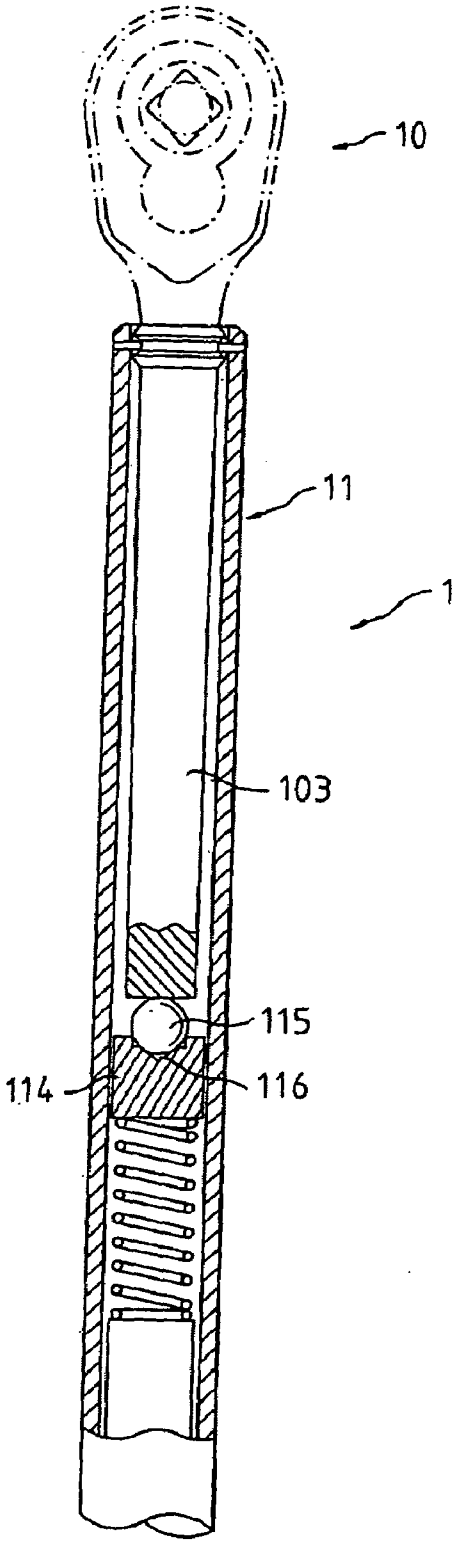
FIGS. 8 and 9 are partial cross sectional views of the second embodiment of the omnidirectional twisting tool of the present invention
Figure 9:
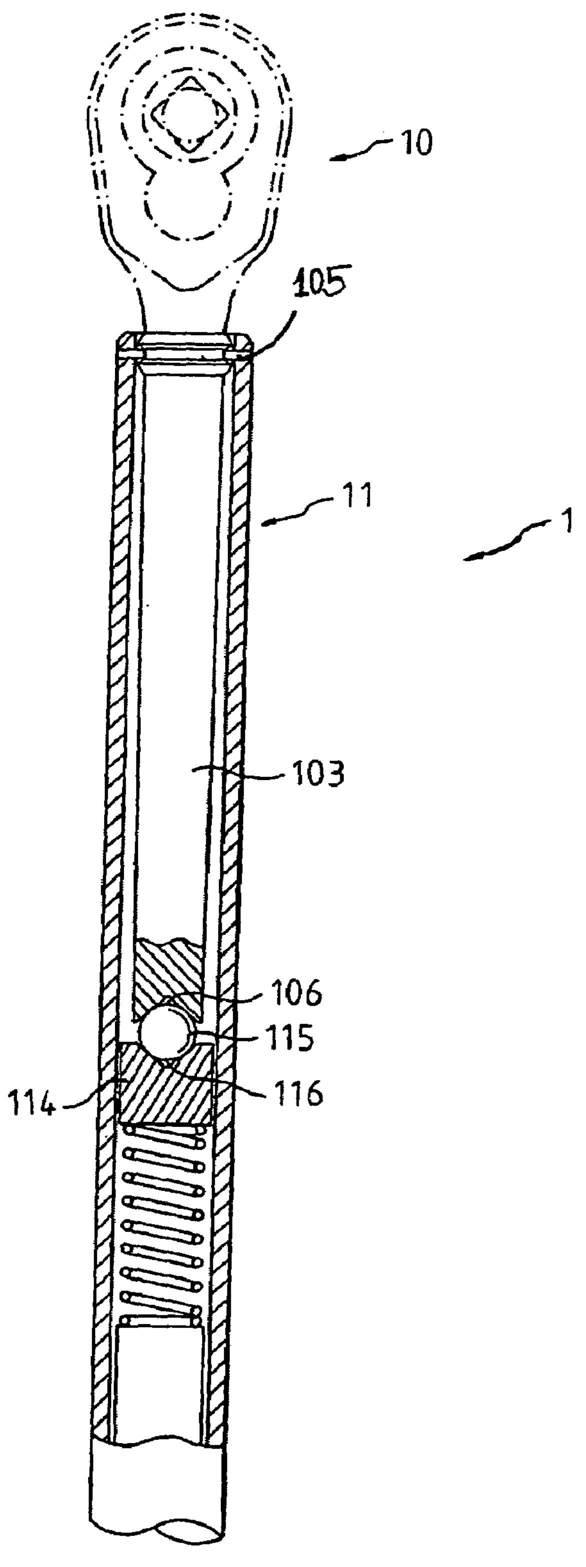

In the present invention, the notch 106 of the connecting rod 103 and the groove 116 of the supporter 114 are round grooves. However other shapes are permissible. For example, referring to FIGS. 8 and 9, another embodiments of the present invention are illustrated. In FIG. 8, the lower side of the connecting rod 103 has a flat surface and the supporter 114 has the groove 116. In FIG. 9, the notch 106 of the connecting rod 103 and the groove 116 of the supporter 114 are all tapered recesses.

Figure 10:
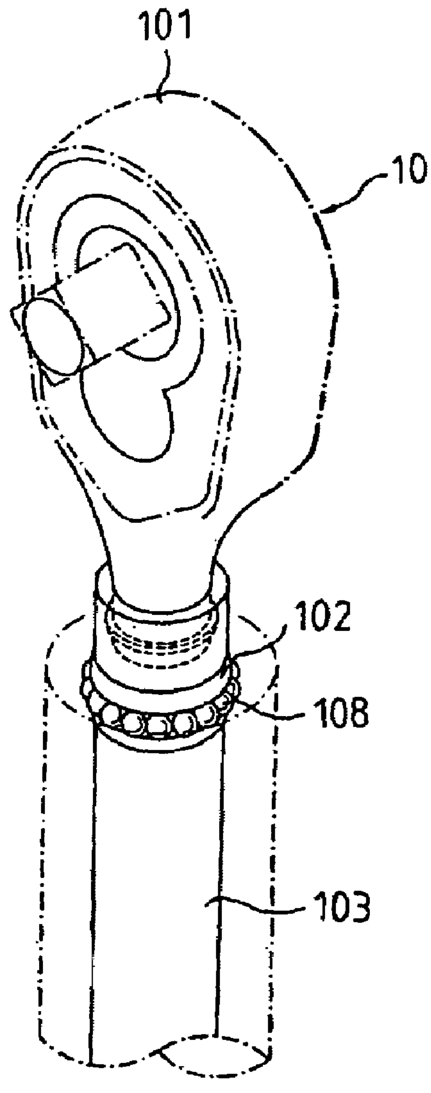
FIG. 10 is a perspective view of the third embodiment of the present invention.
Figure 11:
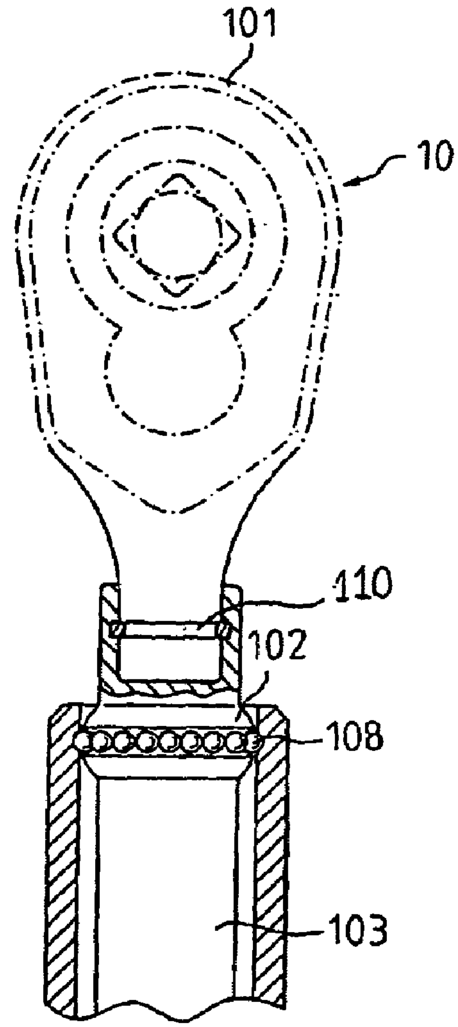
FIG. 11 is a cross sectional view of the third embodiment of the present invention.
Figure 12:
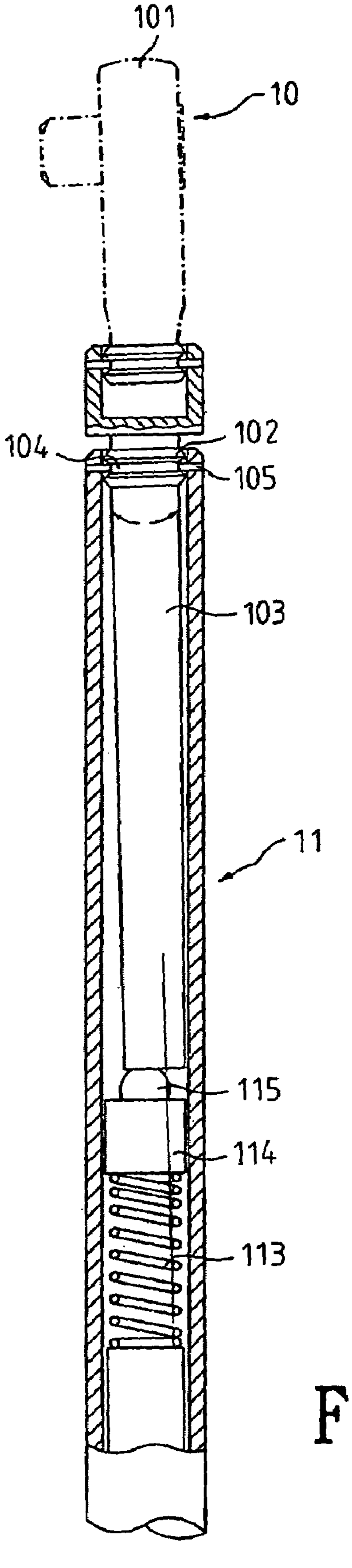
FIG. 12 shows one arrangement of the third embodiment of the present invention.

Referring to FIGS. 10 and 11, another embodiment of the present invention is illustrated. In this embodiment, the driving head 101 of the spanner body 1 is pivotally installed at an outer end of the rotary unit 102. The driving head 101 is rotatable. The driving head 101 has a neck portion 110 so as to confine driving head 101 to the rotary unit 102. FIG. 12 shows one design of the driving head 101 pivotally installed at the outer end of the rotary unit 102.

Figure 13:
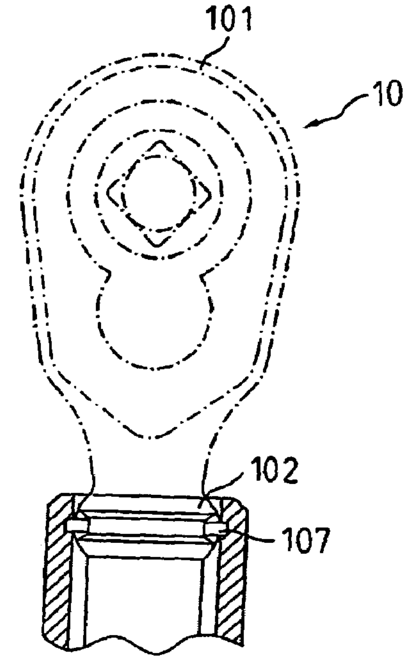
FIGS. 13 and 14 shows the fourth embodiment of the present invention.
Figure 14:
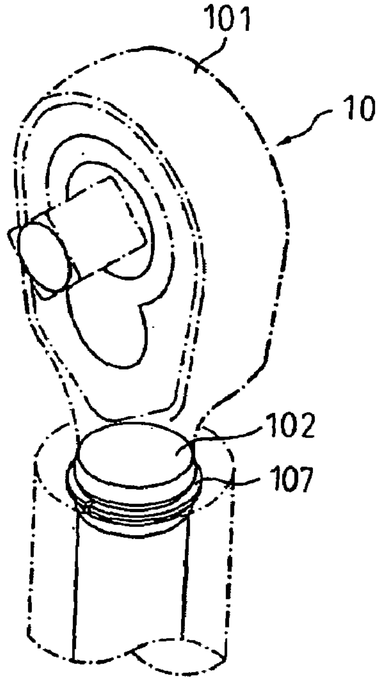
Figure 15:
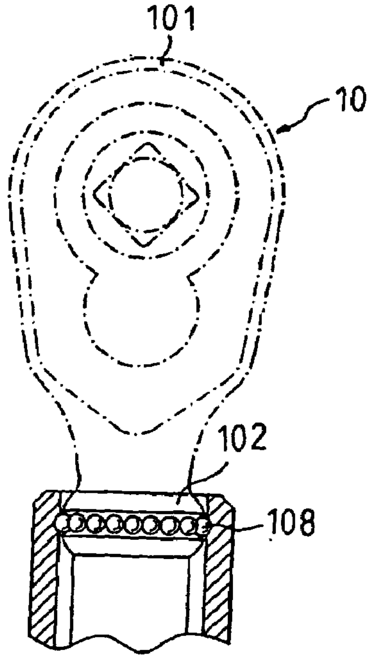
FIGS. 15 and 16 shows the fifth embodiment of the present invention.
Figure 16:
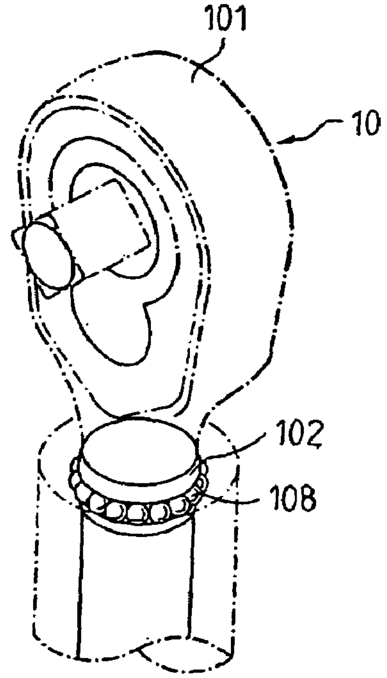

FIGS. 13 to 16 show other embodiments of the present invention. In FIGS. 13 and 14, the pins 15 are replaced by a C ring 107. In FIGS. 15 and 16, steel balls 108 are used to replace the pins 105.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An omnidirectional twisting tool comprising:

a handle; the handle being a hollow tube body; one end of the handle being opened;

a strain gauge installed at a lower portion of the handle; the strain gauge including an integrating element and a connecting unit for connecting the integrating element and a driving portion; values of twisting forces in operation being displayed on a display;

a driving head at a front end of the spanner body;

a rotary unit at one end of the driving head; an annular groove being formed at a lateral wall of the rotary unit; the rotary unit being pivotally installed at one end of the handle so that the driving head can rotate through 360 degrees around an axis of the handle;

a connecting rod extending from a lower end of the rotary unit; the connecting rod being received within the handle; the connecting rod being connected to the connecting unit so as to transfer twisting forces of the spanner to the integrating element of the strain gauge; and wherein at least one steel ball is received in the annular groove of the rotary unit so as to confine the rotary unit within the handle.

2. The omnidirectional twisting tool as claimed in claim 1, wherein two ends of a cross section of the annular groove are formed as tapered shapes; thereby other than rotating through 360 degrees around the axis of the handle, the driving portion can rotate around a center of the annular groove according to the arc of the tapered shape.

3. The omnidirectional twisting tool as claimed in claim 1, wherein the connecting unit is formed by an elastic element, a supporter and a ball; one end of the supporter is in contact with the elastic element and another end thereof supports the ball; and the ball is connected to the connecting rod so as to transfer twisting forces to the integrating element.

* * * * *